United States Patent
Lysik et al.

[11] Patent Number: 6,113,652
[45] Date of Patent: *Sep. 5, 2000

[54] COMMUNICATIONS NETWORK EQUIPMENT CAPABLE OF NON-DISRUPTIVE SOFTWARE UPGRADE

[75] Inventors: John L. Lysik, Burlington; L. David Danenberg, Woodbury; James C. Chagnon, Southington, all of Conn.

[73] Assignee: General Data Comm, Inc., Middlebury, Conn.

[*] Notice: This patent is subject to a terminal disclaimer.

[21] Appl. No.: 09/272,729

[22] Filed: Feb. 12, 1998

Related U.S. Application Data

[63] Continuation of application No. 08/430,210, Apr. 27, 1995, Pat. No. 5,754,785.

[51] Int. Cl.[7] .................................................. G06F 9/445
[52] U.S. Cl. ............................................. 717/11; 709/223
[58] Field of Search .................... 395/712; 709/216–228, 709/229, 230, 236; 370/17, 54, 60, 229, 416, 466; 717/11

[56] References Cited

U.S. PATENT DOCUMENTS

| | | | |
|---|---|---|---|
| 4,999,806 | 3/1991 | Chernow et al. | 395/712 |
| 5,155,837 | 10/1992 | Liu et al. | |
| 5,274,767 | 12/1993 | Maskovyak | 710/16 |
| 5,379,429 | 1/1995 | Hirasawa et al. | 395/712 |
| 5,421,017 | 5/1995 | Scholz et al. | 395/712 |
| 5,490,134 | 2/1996 | Fernandes et al. | 370/466 |
| 5,754,785 | 5/1998 | Lysik et al. | 709/222 |

OTHER PUBLICATIONS

Stamatclopoulos et al., "A scaleable, platform–based architecture for mulitple domain network management", IEEE, 1995, pp. 1453–1458.

von Eicken et al., "Low–latency communication over ATM networks using active messages", IEEE, 1994, pp. 83–94.

*Primary Examiner*—Kakali Chaki
*Attorney, Agent, or Firm*—David P. Gordon; David S. Jacobson; Thomas A. Gallagher

[57] ABSTRACT

In accord with the objects of the invention, methods and apparatus for controlling communications network equipment are provided. The apparatus is used in a telecommunications network having a plurality of coupled nodes and a network controller coupled to at least one of those nodes, and generally comprises a node apparatus having a backplane and a plurality of functional cards coupled to the backplane. Each of the functional cards has a processor and memory for storing software which is used by the processor. One of the functional cards has memory for storing a current running version of software for each of the other of the plurality of functional cards, and a receiver and memory for storing in background incoming updated versions of software for the plurality of functional cards. The updated versions of software are provided in the overhead portion of the telecommunications signal frame, thereby being non-disruptive to the system. Upon command of the network controller, the updated versions of software are provided in foreground by the functional card having the receiver to the respective software memories of the other cards, thereby causing the other cards to run the updated versions of the software. The updating occurs simultaneously in all nodes.

31 Claims, 6 Drawing Sheets

COMMUNICATIONS NETWORK EQUIPMENT CAPABLE OF NON-DISRUPTIVE SOFTWARE UPGRADE

This application is a continuation of U.S. Ser. No. 08/430,210, filed on Apr. 27, 1995, now U.S. Pat. No. 5,754,785, which is hereby incorporated by reference herein in its entirety.

BACKGROUND OF THE INVENTION

1. Field of Invention

The present invention relates generally to telecommunications. More particularly, the present invention relates to communications network equipment, including hardware and software for implementing non-disruptive software upgrades, for implementing software version fallback, and for implementing distributed software upgrades of communicating network equipment with central control.

2. State of the Art

Current methods of upgrading software in communications networks involves the disruption of customer data for relatively long periods of time (e.g., up to ten hours, depending upon network topology and stability), as the network equipment is shut down for customer data and is configured to receive software from a remote controller over the network. During the software upgrade, if there is a sudden network disturbance, it is possible that certain portions of the network may be isolated. In these situations, if the download sequence is continued, different network regions may end up running potentially incompatible software versions, resulting in the partial inoperability of the network. Even if there is no network disturbance, once a software upgrade of a communications network equipment is complete, the only mechanism for reverting to a previous version of the software is to perform a similar disruptive "upgrade" with the previous version. Thus, the current methods of upgrading software in communications networks can be seen to have serious drawbacks.

SUMMARY OF THE INVENTION

It is therefore an object of the invention to provide a system which conducts a substantially non-disruptive upgrade of communications network equipment.

It is another object of the invention to provide communications network equipment which easily reverts to a previous software version.

It is a further object of the invention to provide a distributed software file transfer capability with the capability of central control in order to provide a flexible upgrade system for communications network equipment which can recover from network disturbances during upgrades.

In accord with the objects of the invention, methods and apparatus for controlling communications network equipment are provided. The apparatus is used in a telecommunications network having a plurality of coupled nodes and a network controller coupled to at least one of those nodes, and generally comprises a node apparatus having a backplane and a plurality of functional cards coupled to the backplane. Each of the functional cards has a processor means and software storage means for storing software which is used by the processor means. One of the functional cards has means for storing a current running version of software for each of the other of the plurality of functional cards, and means for receiving and storing in background incoming updated versions of software for the plurality of functional cards, including means for finding an overhead portion of a telecommunications signal frame. The updated versions of software are provided in the overhead portion of the telecommunications signal frame, thereby being non-disruptive to the system. More particularly, the overhead portion of the telecommunications signal frame is bandwidth retained and maintained by the network controller and is not available for general data transfer between the nodes. The overhead portion is primarily used for network control and diagnostic functions, but often carries null data when the control and diagnostic functions do not utilize the full reserved bandwidth. According to the invention, the null data can be replaced with the software upgrade files during the non-disruptive upgrade.

A network operator is able to monitor the progress of file transfer from the controller and through the nodes, and is also able to monitor the stability of the network as a whole during the file transfer. The file transfer may be automatically interrupted by the nodes or may be manually interrupted by the operator if the files become corrupted or the network becomes instable. If the file transfer is interrupted, the current system software continues to function without interruption. The file transfer may be continued once the network has restabilized. Once file transfer is successfully completed, and upon command of the network controller, the updated versions of software are provided in foreground by the functional card having the means for receiving and storing the software of the other cards to the respective software storage means of the other cards, thereby causing the other cards to run the updated versions of software. The updating occurs simultaneously in all nodes.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
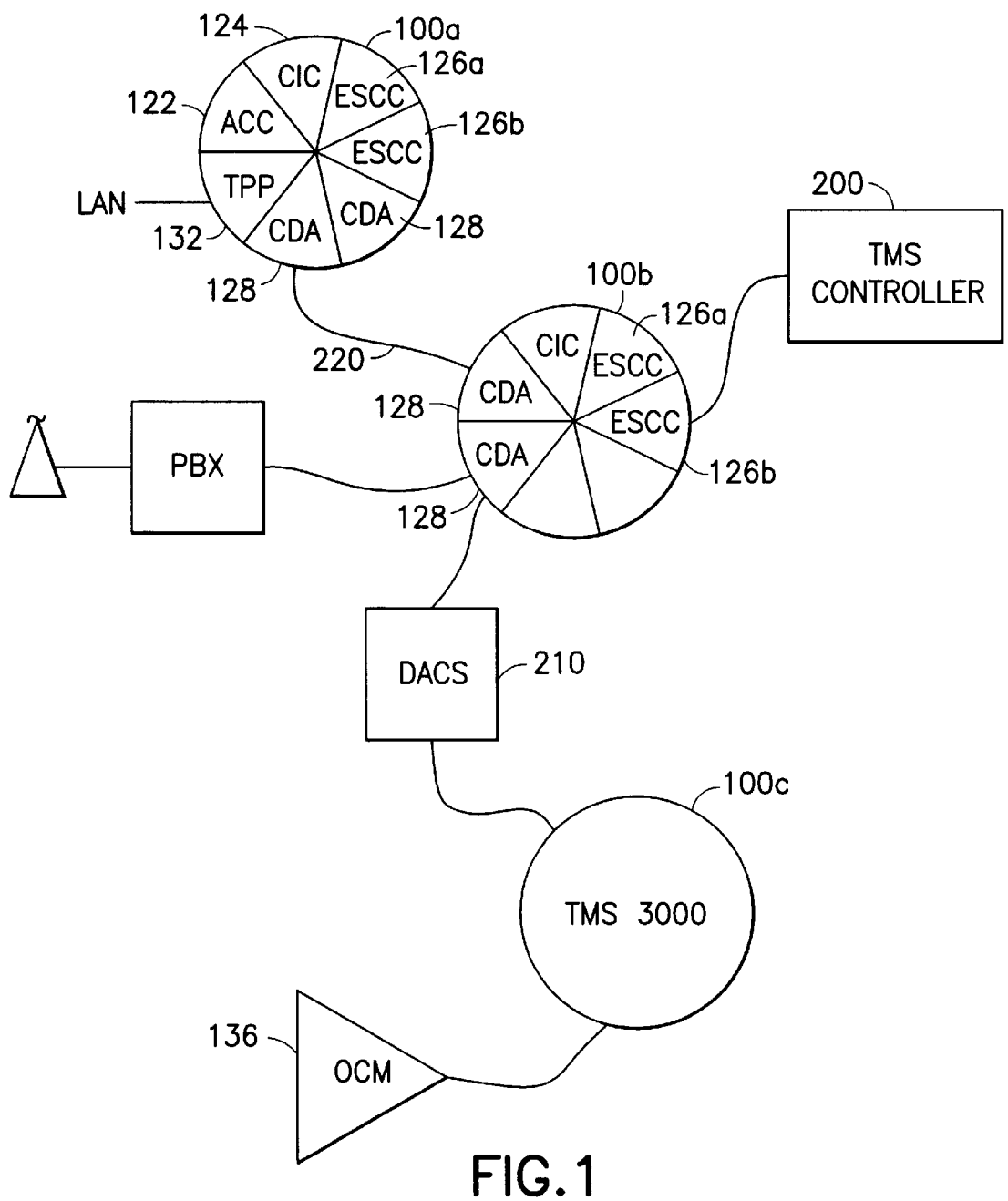
FIG. 1 is a schematic diagram of a telecommunications network having a plurality of nodes and a controller which incorporate the invention therein.

As set forth above, the invention relates to communications network equipment. As indicated in the schematic diagram of FIG. 1, a communications network 10 may include several nodes 100a, 100b, 100c, which are under control of a master network controller 200 (which is typically a personal computer), and optionally other subordinate controllers (not shown), which are coupled together via a DACS 210 or via direct lines 220. The nodes as shown in FIG. 1 are "TMS 3000" nodes (TMS being a trademark of General DataComm, Inc., Middlebury, Conn.) which are available from General DataComm, Inc., the assignee hereof. The TMS 3000 nodes are typically arranged with a backplane structure with an aggregate control card (ACC) 122, a channel interface control card (CIC) 124 for voice, data, etc., an enhanced controller card (ESCC) 126a, preferably a redundant ESCC 126b (as described below with respect to a second embodiment of the invention), and a combined DACS aggregate card (CDA) 128, all of which are available from General DataComm, Inc. The ESCC 126a (and the ESCC 126b discussed below) holds a copy of all of the software for all of the other cards of the TMS 3000 node. The CDA card 128 provides E1 or T1 and PBX interfaces, runs frames, and multiplexes and demultiplexes data. The TMS 3000 node may also include other cards such as a TMS packet processing card (TPP) 132 which can interface with a LAN or other packet or packet-based (e.g., ATM) equipment as seen with reference to node 100a. Also, as shown with reference to node 100c, the TMS 3000 node can interface with equipment such as an office communication manager (OCM) 136 which might include its own set of interface cards such as a line interface module (not shown), and channel cards (not shown).

Figure 3:
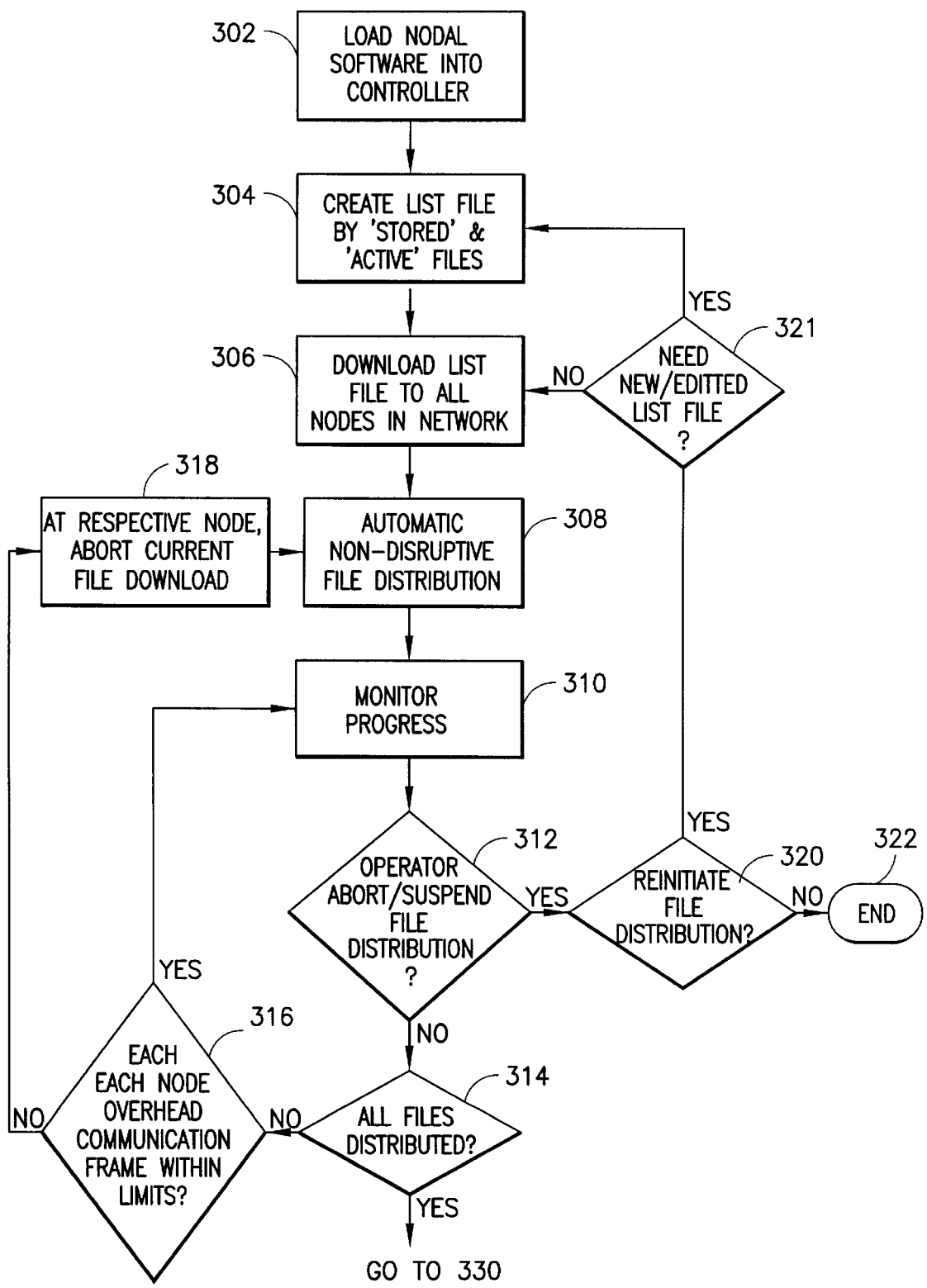
FIGS. 3, 4, and 5 together constitute a flow diagram of the non-disruptive software distribution according to a first embodiment of the invention.

Turning to FIG. 3, in accord with the invention, all new software versions for the communications network are provided (e.g., via floppy disk) at 302 to the master controller 200 and may also be provided to any subordinate controllers. When it is desired to upgrade the entire system with the new software ('upgraded software'), a human operator of the communications system, preferably interacting with the master controller 200 through a visual display and keyboard, selects which files are to be upgraded on the communications network by designating the upgraded version of those files as "stored" files. The master controller 200 then creates at 304 a list file containing two lists and provides at 306 the list file to the ESCC card at the nodes. One list of the list file provides the versions of the files each node should have running (active), and the other list of the list file provides which versions of files should be stored (inactive) at each node in a background area in preparation of the upgrade. In response, in the background, the nodes automatically request at 308 from the neighboring nodes and the master and subordinate controllers the necessary software to fulfill the lists. The node should currently be running the files designated as 'active' by a list in the list file; if not, the node downloads the required active file as described below with respect to the download of stored software. For each instance in which a stored version of a file fails to match the version of that file from the stored file list, a request is sent by that node to its neighboring nodes or controller(s) for the listed version of the software file. According to a preferred aspect of the invention, the node will request all software files in the stored list, whether or not the node has a card which uses the software, in order that the node have all files which may be requested by neighboring nodes. If a neighboring node (or controller) has the requested software, the requested software is sent, preferably in compressed form, to one or more files on the requesting node (from controller to node, and from node to node) in an overhead portion (e.g., COMMS) of an already existing data communications frame. If two or more neighboring nodes (or controllers) have the requested software, the ESCC of the requesting node chooses the link with the most available bandwidth. If no neighboring node has the file, the node will continue to request the file from neighboring nodes until a neighboring node has the file such that the file may then be transferred in the overhead portion of the communications frame to the requesting node. It will be appreciated that the overhead portion of the telecommunications signal frame is a set amount of bandwidth in the frame which is retained and maintained by the network controller. The overhead portion of bandwidth is not available for general data transfer between the network controller and nodes. The overhead portion is primarily used for network control and diagnostic functions, but often carries null data when the control and diagnostic functions do not utilize the full reserved bandwidth. According to the invention, the null data can be replaced with the software upgrade files during the non-disruptive upgrade.

The operator is preferably able to monitor at 310 on the visual display the progress and integrity of all the file downloads and the stability of the network, and may abort or suspend at 312 the background file distribution at any time. In particular, if there is a sudden network disturbance, portions of the network may be isolated resulting in some nodes running different and potentially incompatible software versions. Therefore, the operator may decide at 312 to suspend the upgrade process until the network has stabilized. If the file distribution is manually suspended, the operator may later reinitiate at 320 software distribution by deciding at 321 whether to send again the same file, an edited file, or new file, and then, respectively, resending at 306 the above created list file, editing and resending the above described list file, or creating at 304 a new list file. If the operator does not want to reinitiate file distribution, the file distribution process is aborted at 322. If the operator does not abort or suspend file distribution, by default, the non-disruptive file distribution will continue until complete. It will be appreciated that because the upgrade files, as downloaded, are stored in a manner which does not overwrite or conflict with the operation of the current running software, an aborted file distribution will not disrupt performance of the network.

During file distribution at 314, the transfer of the requested file must not hinder normal data communications between the nodes and controller(s). In addition, if at any point before all files have been distributed the overhead portion of the data communications frame becomes, at 316, too error prone during download, i.e, packet throughput of the file being downloaded is interrupted for a predetermined period of time (e.g., two minutes), the ESSC of the requesting node aborts at 318 the file download from the controller and neighboring nodes and then reinitiates at 308 the download when the overhead portion has greater available bandwidth. Otherwise, progress is continued to be monitored at 310. The nodes are able to simultaneously transmit and receive software to and from one or more nodes. A node may download one file to a neighboring node while at the same time receiving another file from any other neighboring node, including the same neighboring node. Unlike other nodes, the office communications manager (OCM) 136 (FIG. 1), preferably only requests the files it will actually use, as it is a "tail" node and does not pass on files to adjacent nodes. As a result of the above, rather than disruptively shutting down the system and sending the software upgrade at high speed over the telecommunications lines in lieu of data, the software is sent non-disruptively in overhead over an extended period of time while the nodes are passing data as usual.

Figure 2:
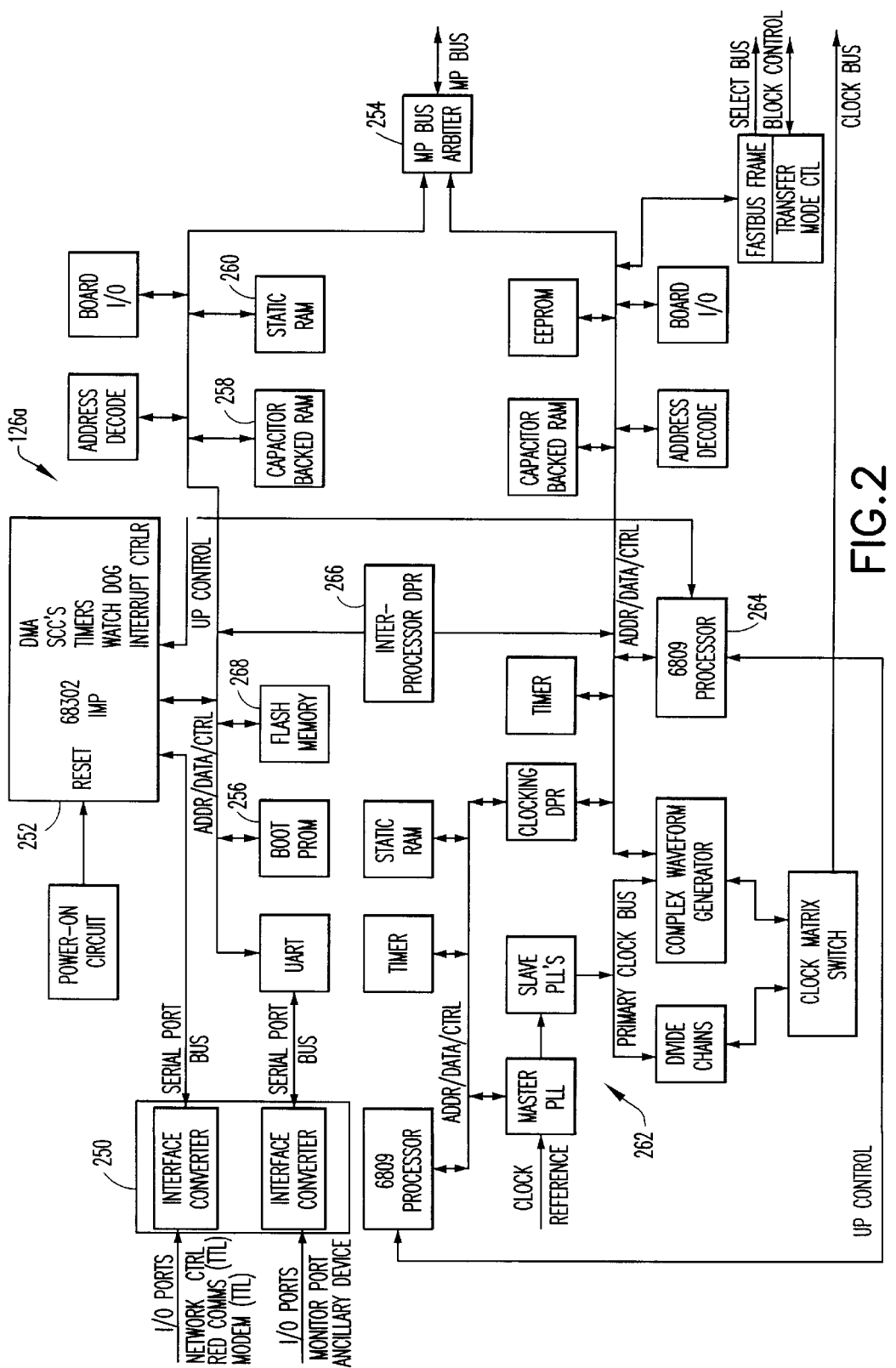
FIG. 2 is a block diagram of the enhanced system controller card which is found at the nodes of FIG. 1.

Referring to FIG. 2, in general, the ESCC card 126a includes an interface 250 with a network controller (e.g., TMS controller 200 in FIG. 1), a master processor 252, a bus interface 254 for the master processor 252, boot PROM 256 for booting the card, capacitor backed RAM 258 for storing configuration files for the node on which the card is located and also for storing current running software files for the card, and static RAM 260. The ESCC card 126a also includes a synchronization clock 262 which is used in finding an overhead portion of a signal received at the ESCC card 126a, a slave processor 264 in communication with the synchronization clock 262 and the master processor 252, and an interprocessor 266 in communication with all of the above ESCC card components. Once the overhead portion of a signal is identified, one or more of the processors 252, 264, 266 distinguishes data relating to file upgrades from data relating to network control and diagnostic functions. In addition, the ESCC card 126*a* preferably also includes extra memory storage 268 to additionally accommodate the receipt of new software. The ESCC card 126*a* is provided the extra memory storage 268 such that the ESCC card stores the current running software of the CIC, ACC, and CDA cards, and the incoming version upgrade of the software for those cards. The memory storage 268 is preferably non-volatile flash memory as shown in FIG. 2; that is, the memory storage can retain program files for a substantial period of time during a power loss. Alternatively, to reduce storage requirements, the current versions of one or more of the cards can be over-written by the incoming version upgrade and, as such, the software is preferably stored in a manner to permit the receipt of new files which may be larger than the files which they are replacing. However, in that situation, it is desirable to ensure that the current running software is not likely to be corrupted or lost by the CIC, ACC, and CDA cards, and back-up powering means (e.g., batteries) should be provided in order to power those cards. As another alternative, and as discussed in more detail below, a redundant ESCC card can be provided to store the "current" running version (and/or a previous version) of the software.

Figure 4:
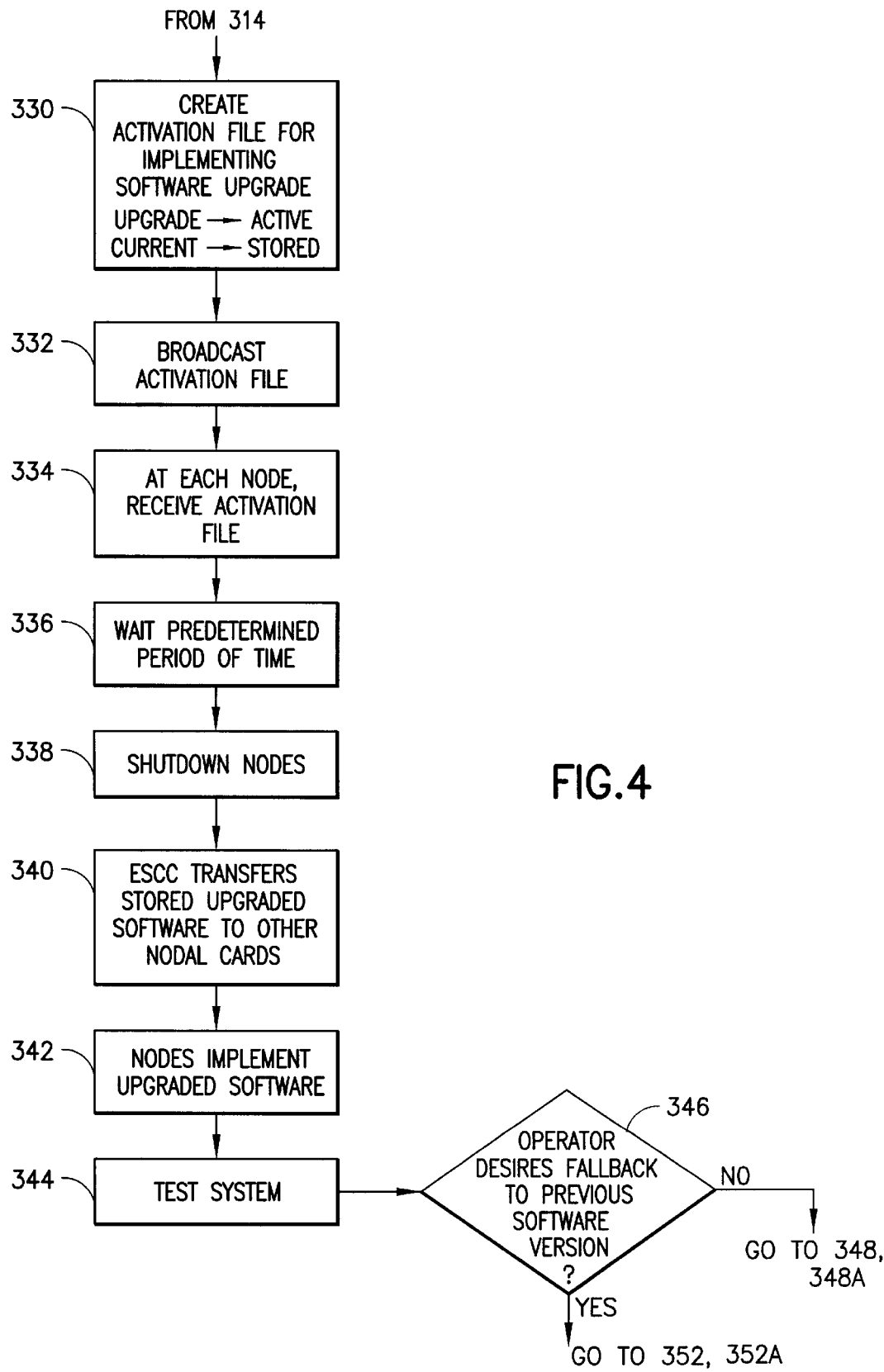
Figure 5:
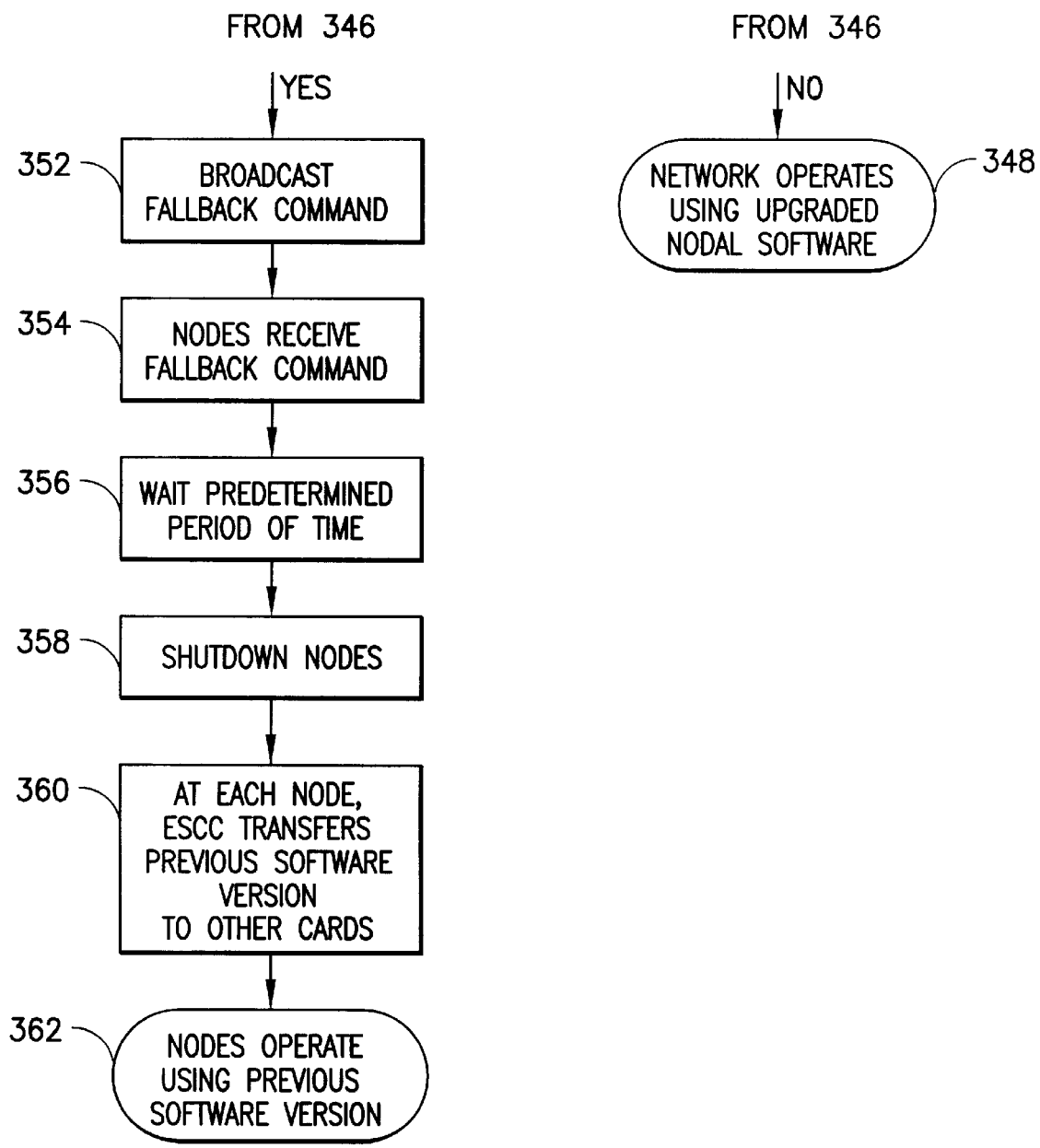

Referring to FIG. 4, regardless of the configuration, when the transmission of the new versions of software to all nodes requiring the new versions is completed, the upgrade is activated, preferably by creating at 330 and broadcasting at 332 a software activate command (or file) from the master controller 200 to the nodes. The software activate command is preferably another file having two lists; the new versions of software are listed as the active versions and the current versions of software are listed as the stored versions. After receiving at 334 the activate command, the active ESCC card on a respective node preferably waits at 336 a predetermined period of time (e.g., two minutes) and then shuts down network operation at 338. The wait at 336 ensures that the activate command has been able to travel through the rest of the network prior to shutting down. When the activate command is acted upon, the currently stored software becomes at 340 the active software, and the currently active software becomes the stored software. While this activation requires that the ESCC card storing the new software version provide necessary software and software changes to the other cards in the TMS 3000 node, and therefore requires shutting down at 338 the node from network operation during this reprogramming, the disruption time is typically limited to five minutes or less, as the software upgrade is already distributed, and the data transfer rates at the node itself are much greater than the data transfer rates from the controller 200 to the node 100. In other words, the backplane data rates are typically greater than the telecommunications network data rates, and the reprogramming is done in parallel by the nodes, rather than in series. It will be appreciated that because the upgrade process can be centrally controlled by the operator, if there is a sudden need for the network by the users, the activation of the upgraded software can be postponed by the operator until user need has subsided. In addition, if an office communication manager (OCM) is part of the network, rather than sending an activation command to the OCM, the TMS controller controlling the OCM will send a list to the OCM stating which files should be active. The list will match stored "upgraded" files on a card of the OCM. After nodal reprogramming, the nodes are brought back up and implement at 342 the upgraded software. The operator may then test at 344 the operation of the nodes and the network as a whole and, if the network is functioning properly, permit the network to operate fully at 348 with the upgraded software (FIGS. 4 and 5).

Additionally, the upgrade can be activated even when one of the nodes does not have a working copy of one or more of the required files. In that case, the node which is missing one or more components of the already updated software, downloads the required software from the TMS controller 200 and then activates the required software. As the previously missing software is already designated active by the nodes, the node may be set to automatically activate the newly downloaded software upon download.

According to yet another preferred aspect of the invention, an incremental software upgrade may be performed in which an individual node, via a menu selection at a controller, can be selected to receive a file list causing it alone to request a file upgrade or a file patch. After the node requests and receives the file, and the operator is confident that the new software is functionally correctly with respect to that one node, an upgrade can then be implemented with respect to the rest of the nodes on the network, as described above; i.e., by editing the file list, sending the file list through the network to the nodes, and after the nodes have acquired the needed software files, initiating an activate command.

As mentioned above, it is desirable not only to provide a system which conducts a substantially non-disruptive software upgrade, but also provides a significantly simplified software version fallback. In particular, with the systems of the prior art, once a software upgrade of communications network equipment is complete, the only manner of falling back to a previous version of software is to shut down the entire system for another long period of time to perform a similar reversionary upgrade using the previous version. The need to go back to a previous version can be driven by issues realized only once the new software is running on the newly configured network, or by user dissatisfaction with the performance of the new software versions.

According to a first embodiment of the invention, the version fallback feature, described below, is enabled through extra memory provided on the ESCC card which stores the current software version and the incoming upgrade. First, it should be noted that the transfer of software by the ESCC 126*a* to the other cards of the TMS 3000 node (at 340 in FIG. 4) is accomplished by designating the new software as "current software", and designating the "current software" as "previous version software". If no fallback is desired, the network operates normally at 348 with its new "current software". It will be appreciated that the previous "previous version software" may then be overwritten at a later time to receive the next upcoming software revision. Of course, it will be appreciated that the current and previous version software files could be handled in various manners, including transferring of files to certain addresses, or by changing pointers to where the current version, previous version, and subsequent new version software are located. However, regardless of how handled, if it is desired at 346 to quickly fall back to the previous version of software (for example, the current, that is upgraded, software exhibits problems that were not present in the previous version of software), the previous version is on-site at the node, and the fallback can be easily and quickly accomplished by command of the controller 200, as now described.

The operator has the TMS controller broadcast at 352 a fallback command through the network to each of the nodes. Once a node receives at 354 the fallback command, the node preferably waits at 356 a predetermined period of time to ensure that all the nodes have received the fallback command. The nodes then shut down at 358, and at each node, the ESCC transfers at 360 the "previous version software" to the cards on that node. The nodes then operate at 362 using the previous version software. If desired, the "previous version software" is again designated as the "current software".

Figure 6:
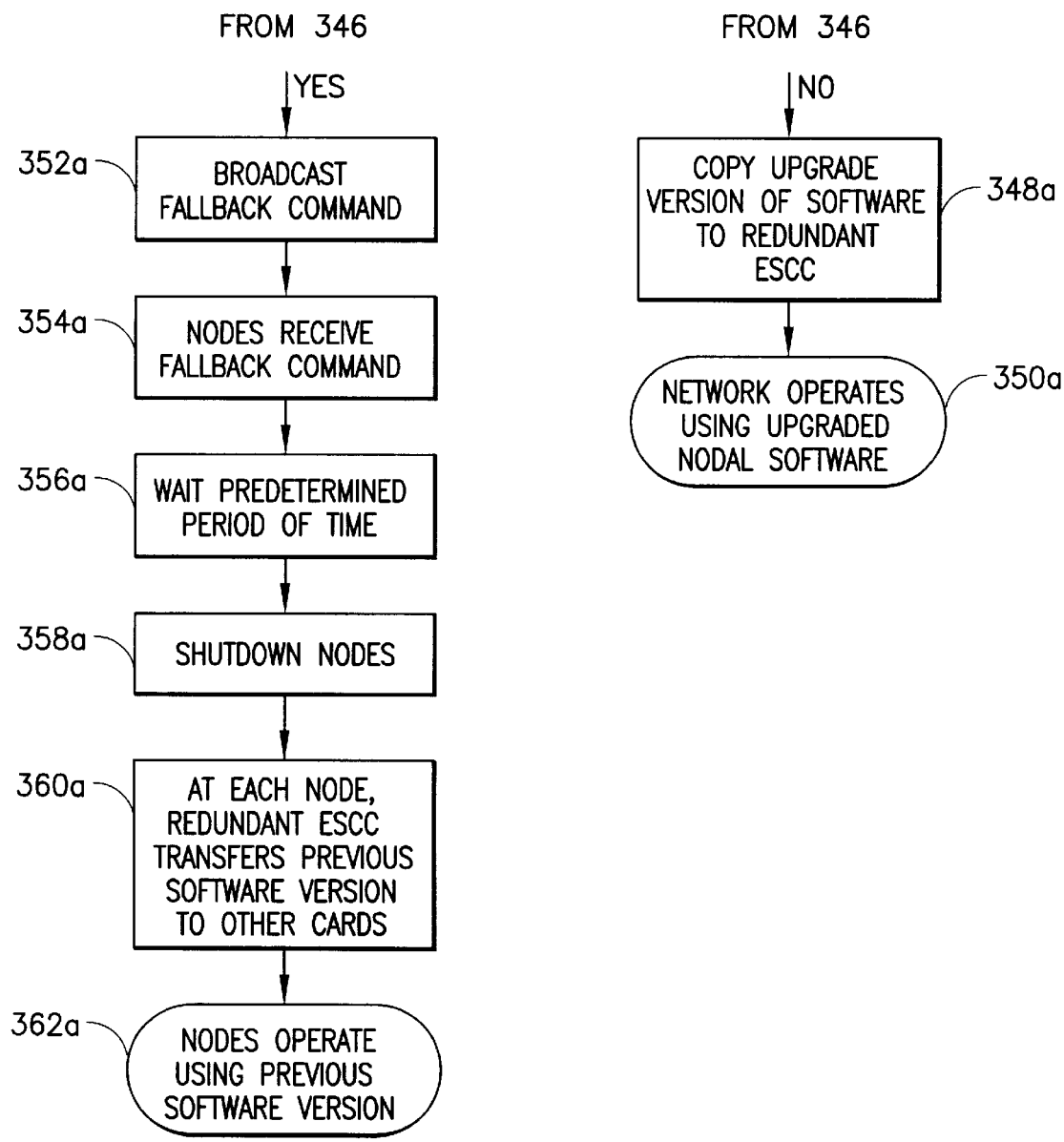
FIG. 6 is a flow diagram of a second embodiment of a software version fallback feature of the non-disruptive software distribution of the invention.

In a second embodiment of the invention, and as currently implemented, instead of providing large amounts of memory on a single ESCC, a redundant ESCC 126b, substantially similar to the above described ESCC 126a, is preferably provided to each node, and each ESCC 126a, 126b has enough storage to store current versions of software for the cards of the TMS 3000 node including the CDA card, as well as enough storage to receive new software for all cards except the CDA card. Effectively, then, as new software is received at the active ESCC, the new and current running versions of software are stored in the active ESCC for all cards except for the CDA, for which the current running version is overwritten with the new version of software for the CDA. The current running software for the CDA is stored in the inactive ESCC and is not overwritten with the new version of CDA software. It will be appreciated that for the sake of reduced vulnerability, when the network incorporates nodes having redundant ESCCs, the network preferably will not begin a nodal software upgrade unless the ESCCs have identical system software files. The CDA is provided with a power back-up, e.g., a battery, so that it will not lose memory in case of a nodal or network-wide power outage. When the new software version is activated system-wide, the new software is transferred to the appropriate cards, and the new software becomes the current version on the network, while the "current version" becomes the previous version. However, because the previously "current version" of the CDA software was being overwritten in the ESCC card, there is no previous version for the CDA software available on the active ESCC. Referring to FIG. 6, it will be appreciated that the redundant ESCC card, however, is maintained in its previous state until the operator causes the controller 200 to cause the nodes to upgrade at 348a the redundant ESCC to the new current version and thereby sets at 350a the upgraded software to be the current software after confirming network performance with the system test at 344 (FIG. 5). After the operator has caused the redundant ESCC to receive the current software version, the easy fallback is not available. Thus, until that time, should a previous version fallback be desired, the previous version software is available from the redundant ESCC. Still referring to FIG. 6, fallback, if desired, is accomplished much in the same manner as with the first embodiment. That is, the operator has the TMS controller broadcast at 352a a fallback command through the network to each of the nodes. Once a node receives at 354a the fallback command, the node preferably waits at 356a a predetermined period of time to ensure that all the nodes have received the fallback command and then shuts down at 358a. At each node, the redundant ESCC 126b transfers at 360a the "previous version software" to the cards on that node. The nodes of the network then operate at 362a using the previous version software. It should be appreciated that in this embodiment, the primary function of the redundant ESCC card is to provide desirable redundancy; and the easy version fallback is an added desirable feature.

In accord with the invention, by combining the basic capability of the distributed software file transfer set forth above with capabilities for central control by the network controller, which is further under control of the network operator, a more flexible upgrade system is generated.

There have been described and illustrated herein communications network equipment apparatus and methods relating thereto. While particular embodiments of the invention have been described, it is not intended that the invention be limited thereto, as it is intended that the invention be as broad in scope as the art will allow and that the specification be read likewise. Thus, while the TMS 3000 was described as preferably having redundant ESCC cards, it will be appreciated by those skilled in the art, that the software version fallback, and the substantially non-disruptive software upgrade can be accomplished with a single ESCC card as described. Also, while a specific embodiment of the ESCC card is shown with reference to FIG. 2, it will be appreciated that other circuitry could be utilized to implement the invention. In addition, while a non-disruptive software upgrade has been described with respect to nodal software, it will be appreciated that a non-disruptive boot upgrade and configuration file upgrade can likewise and similarly be accomplished; it will be further appreciated that because the boot files and configuration files are relatively small, the boot files do not need to be distributed in compressed form. Also, while the nodes are described as being coupled together with a backplane, it will be appreciated the backplane could be a midplane or other electrical coupling means. It will therefore be appreciated by those skilled in the art that yet other modifications could be made to the provided invention without deviating from its spirit and scope as so claimed.

We claim:

1. In a telecommunications network having a plurality of coupled nodes and a network controller coupled to at least one of those nodes, a node apparatus comprising:

a) coupling means for electrically coupling functional cards; and b) a plurality of functional cards coupled to said coupling means, each card having a processor means and software storage means for storing software which is used by said processor means, with one of said functional cards comprising means for storing a current running version of software for each of the other of said plurality of functional cards, and means for receiving and storing in background incoming updated versions of software for said plurality of functional cards, said updated versions of software being provided to said means for receiving in an overhead portion of a telecommunications signal frame, thereby being non-disruptive to said network, wherein upon command of said network controller, said updated versions of software are provided in foreground by said functional card having said means for receiving and storing to respective processor means and software storage means of the others of said plurality of functional cards, thereby causing said others of said plurality of functional cards to run said updated versions of software.

2. A node apparatus according to claim 1, further comprising:

c) previous version memory means for storing a previous version of software.

3. A node apparatus according to claim 2, wherein:

said previous version memory means is located on a card which is redundant to said card having said means for receiving.

4. A node apparatus according to claim 2, wherein:

said previous version memory means is located on said card having said means for receiving.

5. A method of updating software in a plurality of nodes in a telecommunications network, the telecommunications network having a network controller, and node apparatus at each of said plurality of nodes, said method comprising:

a) providing to the network controller software files required by the nodes;

b) specifically selecting at the network controller those files desired for background downloading, thereby initiating the background download of those selected files to the nodes;

c) monitoring the stability and integrity of the telecommunications network during the background download; and d) upon determining that all nodes have received the required software files, activating the update by sending a global message to the nodes from the network controller to simultaneously install the background files in the foreground of the nodes.

6. In a telecommunications network having a plurality of coupled nodes and a network controller coupled to at least one of those nodes, a node apparatus comprising:

a) a plurality of functional cards, each functional card having a processor means and software storage means for storing software which is used by said processor means, with one of said functional cards further comprising means for storing a current running version of software for each of the other of said plurality of functional cards, means for receiving and storing in background incoming updated versions of software for said plurality of functional cards, and means for receiving a software update command from the network controller, said processor means of said one of said functional cards including means for distinguishing an overhead portion of a telecommunications signal from a data portion of the telecommunications signal and for obtaining an updated version of software provided to said means for receiving and storing in the overhead portion of the telecommunications signal frame such that performance of the telecommunications network is not degraded during receiving and storing in background the updated version of software; and b) coupling means for electrically coupling said plurality of functional cards, wherein when said one of said functional cards receives the software update command from the network controller, said updated version of software is provided in foreground by said one of said functional cards thereby causing said others of said plurality of functional cards to run the updated version of software in place of an older version of software.

7. A node apparatus according to claim 6, wherein:

means for distinguishing an overhead portion of a telecommunications signal from a data portion of the telecommunications signal comprises a clock.

8. A node apparatus according to claim 6, further comprising:

c) previous version memory means for storing a previous version of software.

9. A node apparatus according to claim 8, wherein:

said previous version memory means is located on a card which is redundant to said card having said means for receiving.

10. A node apparatus according to claim 8, wherein:

said previous version memory means is located on said card having said means for receiving.

11. A node apparatus according to claim 8, wherein:

said previous version memory means is a flash memory means.

12. A node apparatus according to claim 6, further comprising:

c) means for interrupting said means for receiving and storing in background incoming updated version of software, such that said nodal apparatus may abort the reception of incoming updated version of software.

13. A node apparatus according to claim 12, wherein:

said processor means includes means for determining whether the overhead portion of the telecommunications signal frame exceeds a predetermined error limit and, if so, activates said means for interrupting said means for receiving and storing.

14. A node apparatus according to claim 8, further comprising:

d) fallback means for causing said previous version memory means to provide said previous version of software to said plurality of functional cards.

15. A node apparatus according to claim 6, further comprising:

c) means for transmitting updated version of software to another said node apparatus.

16. A node apparatus according to claim 15, wherein:

said means for receiving and storing and said means for transmitting operate simultaneously.

17. A telecommunications network supervisable by a human operator, comprising:

a) a network controller; and b) a plurality of nodes, each of said nodes being coupled to at least one other of said plurality of nodes and at least one of said nodes being coupled to said network controller, each of said nodes having, i) a plurality of functional cards, each card having a processor means and software storage means for storing software which is used by said processor means, with one of said functional cards further comprising means for storing a current running version of software for each of the other of said plurality of functional cards, means for receiving and storing in background incoming updated version of software for said plurality of functional cards, and means for receiving a software update command, said processor means of said one of said functional cards including means for distinguishing an overhead portion of a telecommunications signal from a data portion of the telecommunications signal and for obtaining updated versions of software provided to said means for receiving and storing in background such that performance of the telecommunications network is not degraded during receiving and storing in background said updated version of software, and ii) coupling means for electrically coupling said plurality of functional cards together, wherein when said means for receiving a software update command of said one of said functional cards receives the software update command from said network controller, said one of said functional cards provides updated version of software in foreground to respective processor means and software storage means of the others of said plurality of functional cards, thereby causing said others of said plurality of functional cards to run said updated version of software.

18. A telecommunications network according to claim 17, wherein:
said means for distinguishing the overhead portion comprises clock.

19. A telecommunications network according to claim 17, wherein:
in each of said plurality of nodes, said functional card which has said means for receiving and storing further includes previous version memory means for storing a previous version of software.

20. A telecommunications network according to claim 19, wherein:
said previous version memory means is located on a card which is redundant to said card having said means for receiving.

21. A telecommunications network according to claim 19, wherein:
said previous version memory means is located on said card having said means for receiving.

22. A telecommunications network according to claim 19, wherein:
each of said plurality of nodes includes fallback means for causing said previous version memory means to provide said previous version of software to said plurality of functional cards located on said each of said plurality of nodes.

23. A telecommunications network according to claim 17, further comprising:
c) monitoring means coupled to said network controller for supervising said distribution of software upgrade files between the plurality of nodes and monitoring network stability.

24. A telecommunications network according to claim 23, wherein:
said monitoring means is monitorable by the human operator, and the human operator may cause said network controller to cause said plurality of nodes to abort said distribution of software upgrade files.

25. A telecommunications network according to claim 17, wherein:
each of said plurality of nodes is able to receive said updated version of software from another node coupled to each said node and is able to transmit said updated version of software to another node coupled to each said node.

26. A telecommunications network according to claim 25, wherein:
at least one of said plurality of nodes is simultaneously able to receive at least a first file of said updated version of software from another node coupled thereto and to transmit at least a second file of said updated version of software to said another node.

27. In a telecommunications network having a plurality of coupled nodes and a network controller coupled to at least one of those nodes, a node apparatus comprising:
a) a coupling means for electrically coupling functional cards; and b) a plurality of functional cards coupled to said coupling means, each card having a processor means and software storage means for storing software which is used by said processor means,
with one of said functional cards further comprising means for storing a current running version of software for each of the other of said plurality of functional cards, means for receiving a telecommunications signal, means for distinguishing a network controller overhead portion of the telecommunications signal from a data portion of the telecommunications signal, means for obtaining from the network controller overhead portion an updated version of software for said plurality of functional cards, and means for storing the updated version of software,
said means for receiving the telecommunications signal, said means for distinguishing the network controller overhead portion, said means for obtaining the updated version of software, and said means for storing the updated version of software are operable such that performance of the telecommunications network is not degraded during obtaining in background the updated version of software,
wherein upon command of the network controller, said updated version of software is provided in foreground by said one of said functional cards, thereby causing said others of said plurality of functional cards to run the updated version of software.

28. A telecommunications network according to claim 27, wherein:
said means for distinguishing the network controller overhead portion comprises a clock.

29. A telecommunications network for carrying a telecommunications signal, comprising:
a) a network controller; and
b) a plurality of nodes coupled to said network controller, said network controller reserving an overhead portion of the telecommunications signal for communicating with said plurality of nodes,
each of said plurality of nodes having means for determining one or more files required by said plurality of nodes for a software upgrade of said telecommunications network, means for requesting from another node coupled to said node the one or more files required, and means for receiving the one or more files from the other node coupled to said node,
wherein said means for requesting makes a request in the overhead portion of the telecommunications signal and said means for receiving receives in the overhead portion of the telecommunications signal.

30. A telecommunications network according to claim 29, wherein:
each of said plurality of nodes has means for transmitting files to other nodes coupled to each said node,
wherein said means for transmitting transmits in the overhead portion of the telecommunications signal.

31. A telecommunications network according to claim 30, wherein:
said means for receiving and said means for transmitting are able to operate substantially simultaneously.

* * * * *